United States Patent [19]
Takahashi et al.

[11] Patent Number: 5,918,164
[45] Date of Patent: *Jun. 29, 1999

[54] RADIO COMMUNICATION APPARATUS

[75] Inventors: Akira Takahashi, Oume; Hironori Fujii, Hino, both of Japan

[73] Assignee: Kabushiki Kaisha Toshiba, Kawasaki, Japan

[ * ] Notice: This patent is subject to a terminal disclaimer.

[21] Appl. No.: 08/825,709

[22] Filed: Mar. 19, 1997

Related U.S. Application Data

[62] Division of application No. 08/525,166, Sep. 8, 1995, Pat. No. 5,634,204.

[30] Foreign Application Priority Data

Sep. 9, 1994 [JP] Japan ................................. 6-216228

[51] Int. Cl.$^6$ ................................. H04B 17/02
[52] U.S. Cl. ........................ 455/134; 455/277.1; 455/65
[58] Field of Search .................... 455/132, 133, 455/134, 135, 277.1, 277.2, 504, 506, 65

[56] References Cited

U.S. PATENT DOCUMENTS

| | | | |
|---|---|---|---|
| 4,035,728 | 7/1977 | Ishikawa et al. | 455/132 |
| 4,742,563 | 5/1988 | Fukumura | 455/132 |
| 4,969,207 | 11/1990 | Sakamoto et al. | 455/134 |
| 5,535,440 | 7/1996 | Clappier | 455/134 |
| 5,548,836 | 8/1996 | Taromaru | 455/277.1 |

*Primary Examiner*—Reinhard J. Eisenzopf
*Assistant Examiner*—Darnell R. Armstrong
*Attorney, Agent, or Firm*—Finnegan, Henderson, Farabow, Garrett & Dunner, L.L.P.

[57] ABSTRACT

A mean value of a received signal level is calculated by a mean value computing unit, a product of multiplying this received signal mean level by a prescribed ratio is calculated by a threshold computing unit and used as a first threshold value, and when the received signal level drops below this first threshold value, communication is performed by making a switch to an antenna that receives signals at a received signal level that is higher than the first threshold value. Switching of receiving antennas is not made when the received signal mean level calculated by the mean value computing unit falls below a second threshold value. This allows antenna switching to be performed in accordance with changes in the received signal level and prevents unnecessary antenna switching from being made when the level falls below the second threshold value.

5 Claims, 13 Drawing Sheets

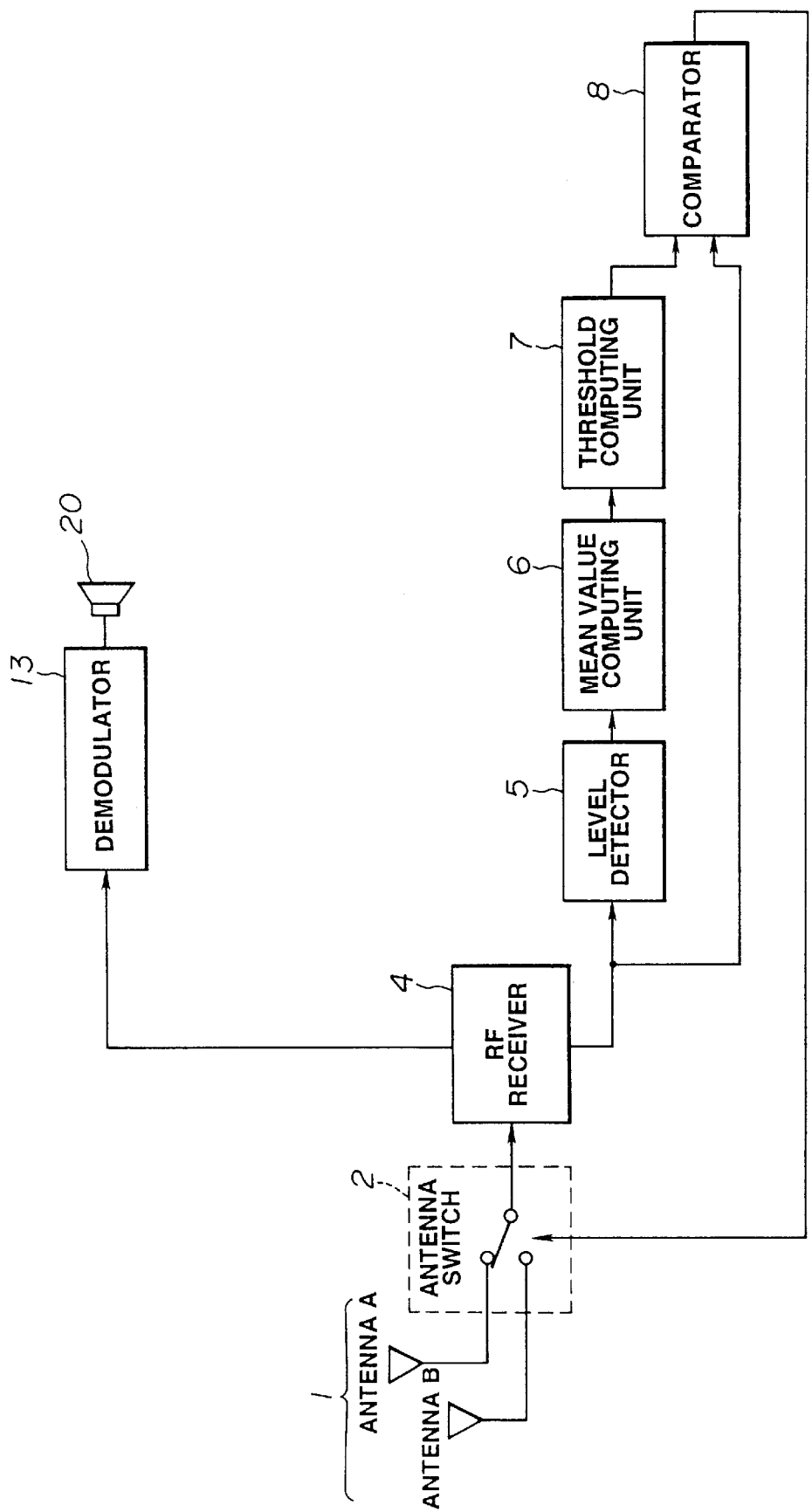

RADIO COMMUNICATION APPARATUS

This is a division of application Ser. No. 08/525,166, filed Sep. 8, 1995 now U.S. Pat. No. 5,634,204.

BACKGROUND OF THE INVENTION

Field of the Invention

The present invention relates to a mobile radio communication apparatus, and in particular to a mobile radio communication apparatus for accomplishing antenna switching diversity.

Description of the Related Art

In mobile communication, the antenna switching diversity method is used as a method for selecting a transmission path with a minimal characteristic deterioration of incoming signals due to interference waves or fading.

The antenna switching diversity method involves installing a plurality of antennas, using each of the antennas to receive signals transmitted through a plurality of different transmission paths, receiving signals by selecting an antenna that receives the strongest receiving level among the branches of these incoming signals, and, when the receiving level of the selected antenna falls below a predetermined threshold value, receiving signals by switching to an antenna whose receiving level is higher than the threshold level.

A disadvantage of conventional devices involving the use of this antenna switching diversity method is that because antenna switching occurs only when the received signal level changes from a value that is higher than the threshold value to a value that is lower than the threshold value for an antenna in the receiving mode, the result is that when, for example, the receiving levels of two antennas fall below the threshold value in the case of switching diversity performed using two antennas, the fact that the receiving level of the antenna currently not in the receiving mode subsequently returns to a level above the threshold value fails to ensure that a change is made to this antenna from the receiving antenna whose receiving level is below the threshold value, that is, fails to produce the diversity effect. This is caused by a fact that since the threshold value is a fixed value, a received signal level stays at a value lower than the fixed threshold value when a poor signal receiving condition continues.

There is another method to overcome this deficiency. When the level of the receiving antenna has fallen below the threshold value and another antenna is selected and the level of another antenna falls below the value, the initial antenna is again selected. A problem occasionally encountered in such cases, however, is that when the receiving levels of both antennas fall below the threshold value, fast switching continuously occurs between the two antennas, and the noise generated by such switching makes it virtually impossible to receive signals.

An undesirable phenomenon that sometimes results is that when the threshold level is lowered to avoid this, it becomes impossible to fully obtain the targeted diversity effect.

SUMMARY OF THE INVENTION

Thus, shortcomings of devices involving the use of a conventional antenna switching diversity method include the fact that a switch can only occur at a specific receiving level and that fast antenna switching occurs continuously and receiving becomes impossible when the receiving levels of both antennas fall below the threshold value.

An object of the present invention is to overcome these shortcomings and to provide a radio communication apparatus having an antenna switching diversity function, whereby antenna switching occurs in accordance with the overall change of the received signal level, and unnecessary antenna switching is avoided when the level falls below the threshold value.

To achieve the above object, an aspect of the present invention provides a radio communication apparatus for use in a radio communication system, having a radio circuit, the apparatus comprising: a first antenna connected with the radio circuit for receiving first and second signals, wherein the second signal is received more early than a time when the first signal is received; a second antenna; first detecting means for detecting a first level of the first signal and a second level of the second signal; first average calculate means responsive to the first detecting means for calculating a first average level of a signal received by the first antenna from at least the first and second levels; threshold level calculate means for calculating a threshold level by multiplying the average level by a first predetermined value, where the first predetermined value is positive and smaller than 1; first comparing means for comparing the first level with the threshold level; and first control means responsive to the first comparing means for disconnecting the first antenna from the radio circuit and connecting the second antenna with the radio circuit when the first level is smaller than the threshold level.

Another aspect of the present invention provides a radio communication apparatus for use in a radio communication system, having a transmit circuit and a receive circuit, the apparatus comprising: a first antenna for receiving first and second signals, wherein the second signal is received more early than a time when the first signal is received; a second antenna; selecting means for selecting one of the first and second antennas; connecting means for selectively connecting the selecting means with the transmit circuit for a transmit period and selectively connecting the selecting means with the receive circuit for a receive period and selectively disconnecting the selecting means from any one of the transmit and receive circuits for an idle period, and the first antenna being connected with the connecting means by the selecting means; first detecting means for detecting a first level of the first signal and a second level of the second signal for the idle period; first average calculate means responsive to the first detecting means for calculating a first average level of a signal received by the first antenna from at least the first and second levels; threshold level calculate means for calculating a threshold level by multiplying the average level by a first predetermined value, where the first predetermined value is positive and smaller than 1; first comparing means for comparing the first level with the threshold level; and first control means responsive to the first comparing means for causing the selecting means to disconnect the first antenna from the connecting means and to connect the second antenna with the connecting means when the first level is smaller than the threshold level.

BRIEF DESCRIPTION OF THE DRAWINGS

FIG. 1(a) is a block diagram illustrating a receiver of a radio communication apparatus pertaining to an embodiment of the present invention.

DESCRIPTION OF THE PREFERRED EMBODIMENTS

FIG. 1 is a block diagram of an embodiment of the present invention. The structure thereof corresponds to the receiving circuit of a radio communication apparatus.

In FIG. 1, 1 represents antennas, 2 is an antenna switch for switching between an antenna A and an antenna B, 4 is an RF receiver for receiving radio-frequency signals, 5 is a level detector for determining the receiving level of incoming signals, 6 is a mean value computing unit for determining the mean level of incoming signals on the basis of the output from the level detector 5, 7 is a threshold computing unit for determining a threshold value by multiplying the received signal mean level by a certain fixed value, 8 is a comparator for switching antenna by comparing the threshold value with the received signal level, 13 is a demodulator for demodulating the incoming signals, and 20 is a speaker as a telephone receiver.

Figure 1B:
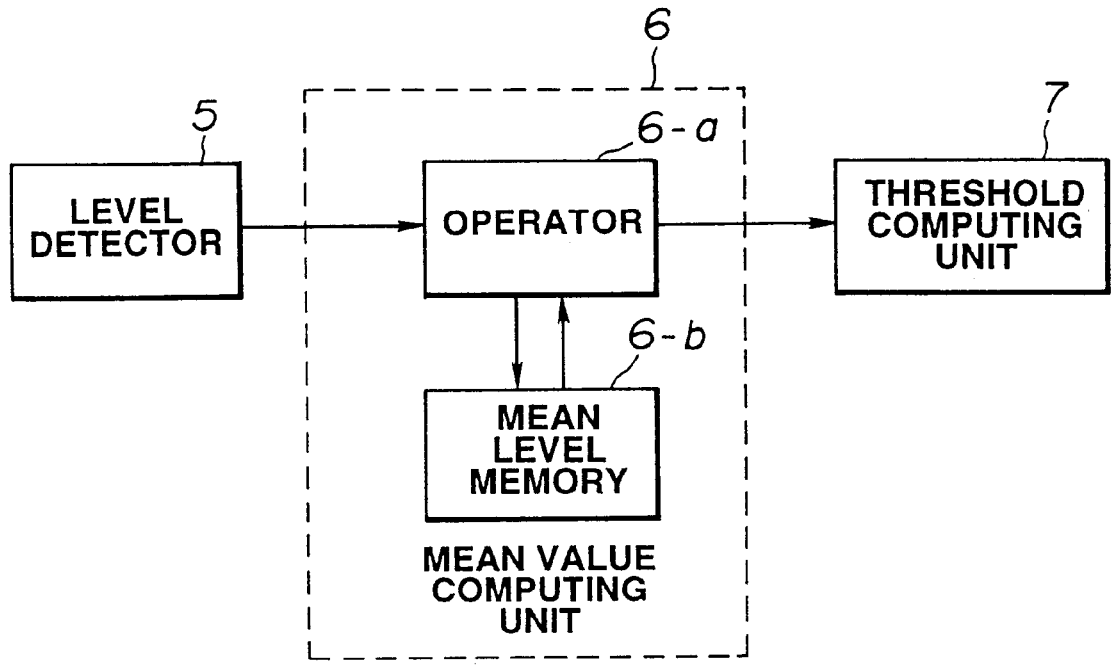
FIGS. 1(b) and 1(c) are block diagrams respectively illustrating a detailed configuration of a mean value computing unit 6 shown in FIG. 1(a)
Figure 1C:
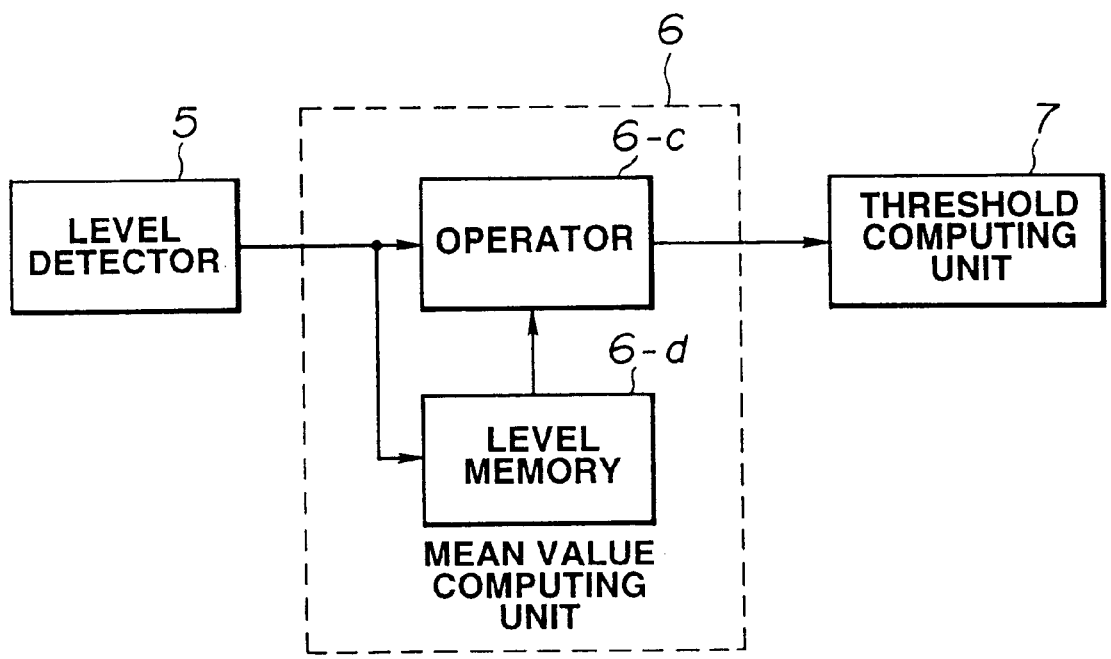
Figure 2:
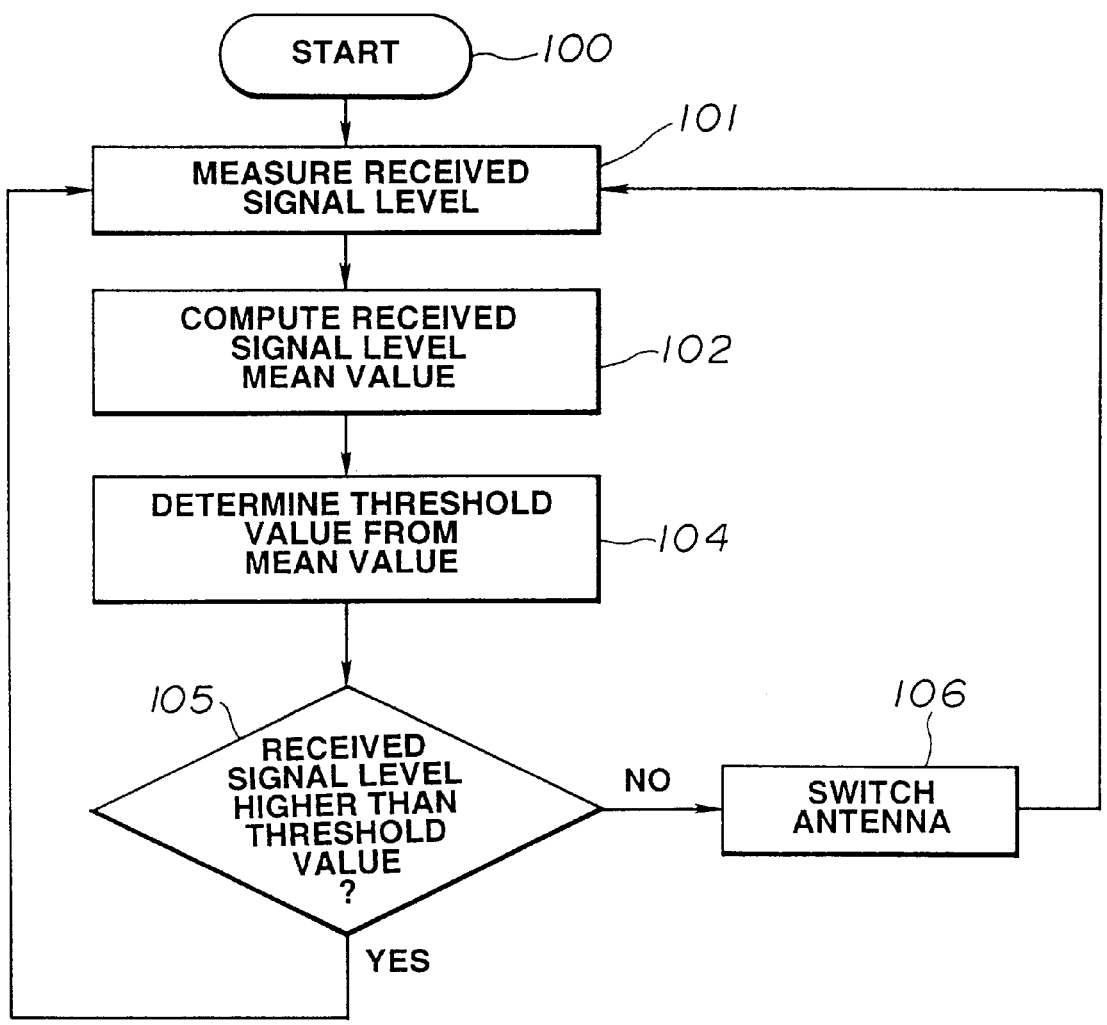
FIG. 2 is a flow chart of an antenna switching operation of the device pertaining to the embodiment illustrated in FIG. 1.

FIG. 2 is a flow chart of the antenna switching operation in FIG. 1.

The operation of this embodiment will now be described with reference to these figures.

First, incoming signals received by the antenna A or B are received by the RF receiver 4, and the level thereof is detected by the level detector 5 (101). The received signal level thus detected is averaged by the mean value computing unit 6, by one of the following methods (102).

For the averaging method, as shown in FIG. 1(b), for example, a mean level $P_{n-1}$ of signals received up to (n−1) th reception is stored in a memory 6-b, a mean level $P_n$ of the signals received up to n-th reception is determined by an operator 6-a from the $P_{n-1}$, and an n-th received signal level $a_n$ in accordance with the Equation (1) below. Further, as shown in FIG. 1(c), levels $a_1, a_2, \ldots, a_{n-1}$ of the signals received up to (n−1) th reception are stored in a memory 6-d and the mean level $P_n$ is determined by an operator 6-c from the n-th received signal level $a_n$ and these values in accordance with the Equation (2) below. When using the Equation (2), the periods for averaging the received signals may be previously determined according to the properties of the received signals, the condition of the transmission path, and other factors, or may be set from the outside.

$$P_n=(P_{n-1}+a_n)/2 \qquad (1)$$

$$P_n=(a_1+a_2+\ldots+a_n)/n \qquad (2)$$

In addition, a threshold value obtained by multiplying the received signal mean level by a fixed value α (0<α<1) is calculated by the threshold computing unit 7 (104), the result is compared by the comparator 8 with the current received signal level (105), and the same antenna continues to be used when the received signal level is higher than the threshold value, or an antenna switch occurs when the received signal level is lower than the threshold value (106).

Figure 3:
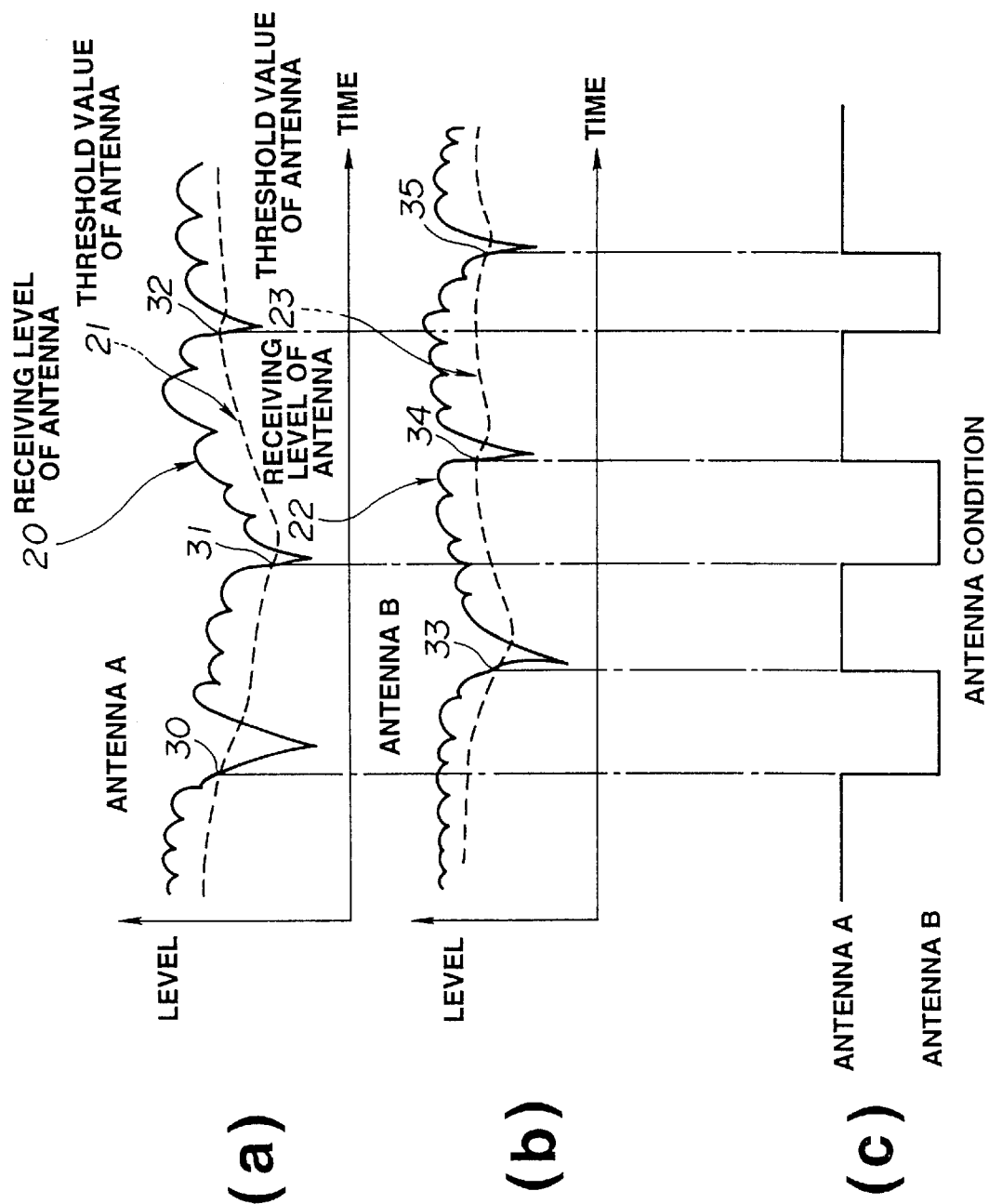
FIG. 3 is a diagram illustrating the relation between a received signal mean level and the antenna switching operation of the embodiment shown in FIG. 1.

FIG. 3 is a diagram illustrating the manner in which antennas are switched in accordance with the practical example under consideration.

Part (a) of FIG. 3 illustrates the received signal level of an antenna A; Part (b) of FIG. 3, the received signal level of an antenna B; and Part (c) of FIG. 3, the manner in which the antennas are used. The dotted line in Part (a) of FIG. 3 indicates the threshold value 21 obtained by multiplying the mean level of the signals received by the antenna A by the fixed value α which is a positive value smaller than 1; the dotted line in Part (b) of FIG. 3 indicates the threshold value 23 obtained by multiplying the mean level of the signals received by the antenna B by the fixed value α which is a positive value smaller than 1.

In FIG. 3, waves received by the antenna A are initially used for reception, but a switch to the antenna B is made at a point in time 30 because at the point 30 the signal level 20 received by the antenna A drops below a threshold value 21 calculated based on the received signal mean level of the antenna A.

Waves received by the antenna B are thus subsequently selected and used from point 30 onward, and a switch to the antenna A is again made because at point 33 a received signal level 22 drops below a threshold value 23, which is calculated from the received signal mean level of the antenna B.

The operation thus involves switching from one antenna to the other when the waves received by the currently selected antenna A or B drop below the threshold value of these received waves, as at points 30 through 35.

The threshold value is a value obtained by multiplying the received signal mean level by a fixed value α (0<α<1), which is in a proportional relationship with the received signal mean level, and set to be lower than the received signal mean level. For this reason, the received signal level of the switched antenna B becomes higher than the threshold value 23, and subsequently, the received signal level of the antenna B changes from the value higher than the threshold value 23 to a value lower than the threshold value 23 at a time point after the antenna change. With this arrangement, the disadvantage encountered in the conventional systems that the antenna is never changed as long as the received signal level stays at a value lower than the threshold level since the threshold value is a fixed value, can be avoided.

Figure 4:
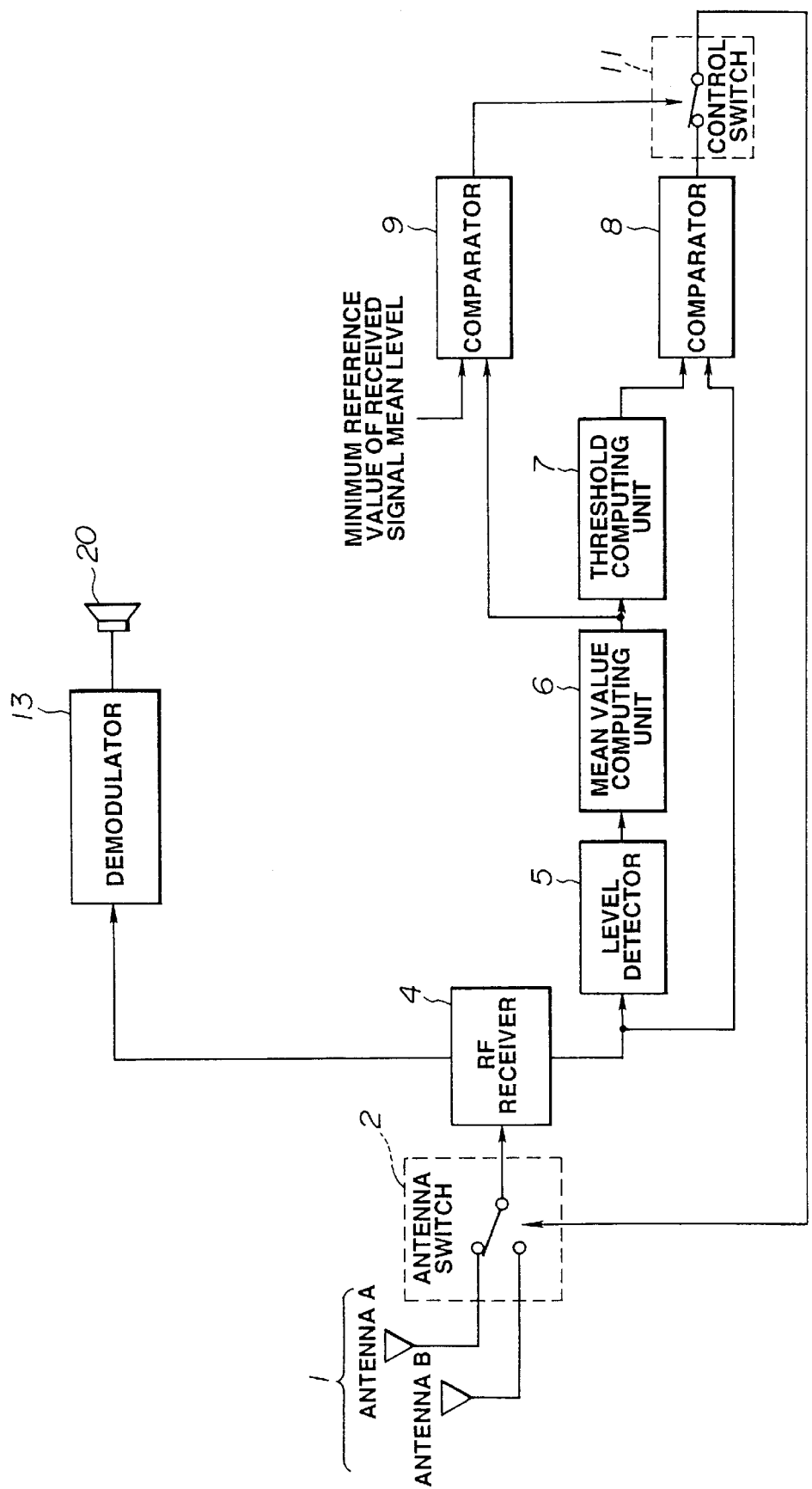
FIG. 4 is a block diagram illustrating a receiver of a radio communication apparatus pertaining to another embodiment of the present invention.

FIG. 4 is a block diagram of another embodiment of the present invention, corresponding to the receiving circuit of a radio communication apparatus.

In FIG. 4, 1 represents antennas, 2 is an antenna switch for switching between an antenna A and an antenna B, 4 is an RF receiver for receiving radio-frequency signals, 5 is a level detector for determining the receiving level of incoming signals, 6 is a mean value computing unit for determining the mean level of incoming signals on the basis of the output from the level detector 5, 7 is a threshold computing unit for determining a threshold value by multiplying the received signal mean level by a certain fixed value, 8 is a comparator A for switching antenna by comparing the threshold value with the received signal level, 9 is a comparator B for comparing the mean level of incoming signals with a preset minimum level, and 11 is a control switch for stopping antenna switching by means of the output from the comparator 9. Identical symbols are assigned to the components that have the same functions as the blocks in FIG. 1.

Figure 5:
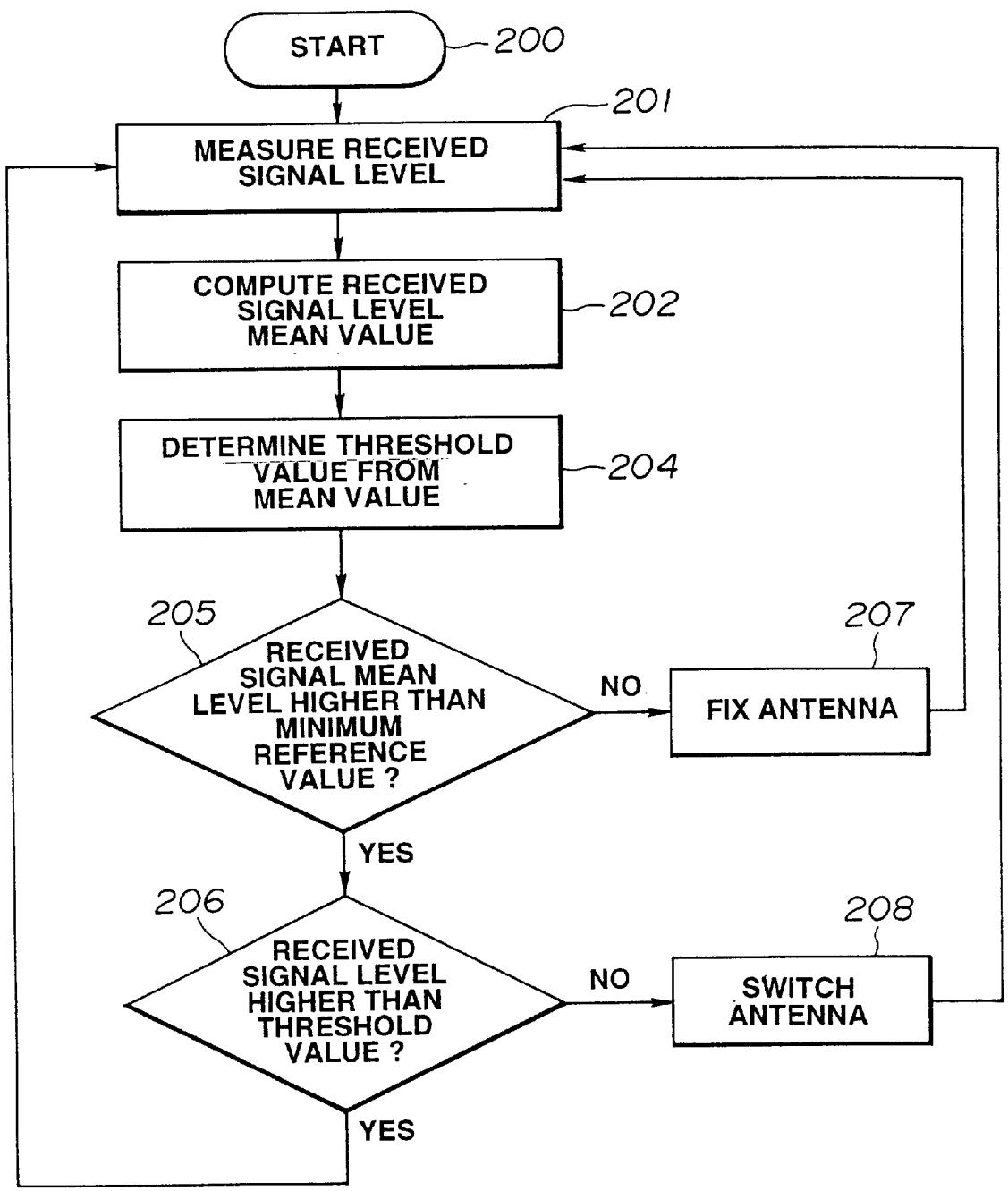
FIG. 5 is a flow chart of the antenna switching operation of the device pertaining to the embodiment illustrated in FIG. 4.

FIG. 5 is a flow chart illustrating the operation of the antenna switching circuit. The operation of the circuit will be described with reference to FIGS. 4 and 5.

First, as in FIG. 2, incoming signals received by the antenna A or B are received by the RF receiver 4, and the level thereof is detected by the level detector 5 (201). The received signal level thus detected is averaged by the mean value computing unit 6, and the mean level of the incoming signals is calculated (202).

A threshold value obtained by multiplying the received signal mean level by a fixed value $\alpha$ ($0<\alpha<1$) is then calculated by the threshold computing unit 7 (204), the result is compared by the comparator 8 with the current received signal level (206), and the same antenna continues to be used when the received signal level is higher than the threshold value, or an antenna switch occurs when the received signal level is lower than the threshold value (208).

In addition, the received signal mean level is compared by the comparator 9 with a preset minimum reference value of the received signal mean level (205). As a result, the control switch 11 is turned off when the received signal mean level is lower than the minimum reference value, and the state of the control switch 11 is fixed in its present position, preventing antenna switch signals generated by the comparator 8 from reaching a switch 3 (207).

Figure 6:
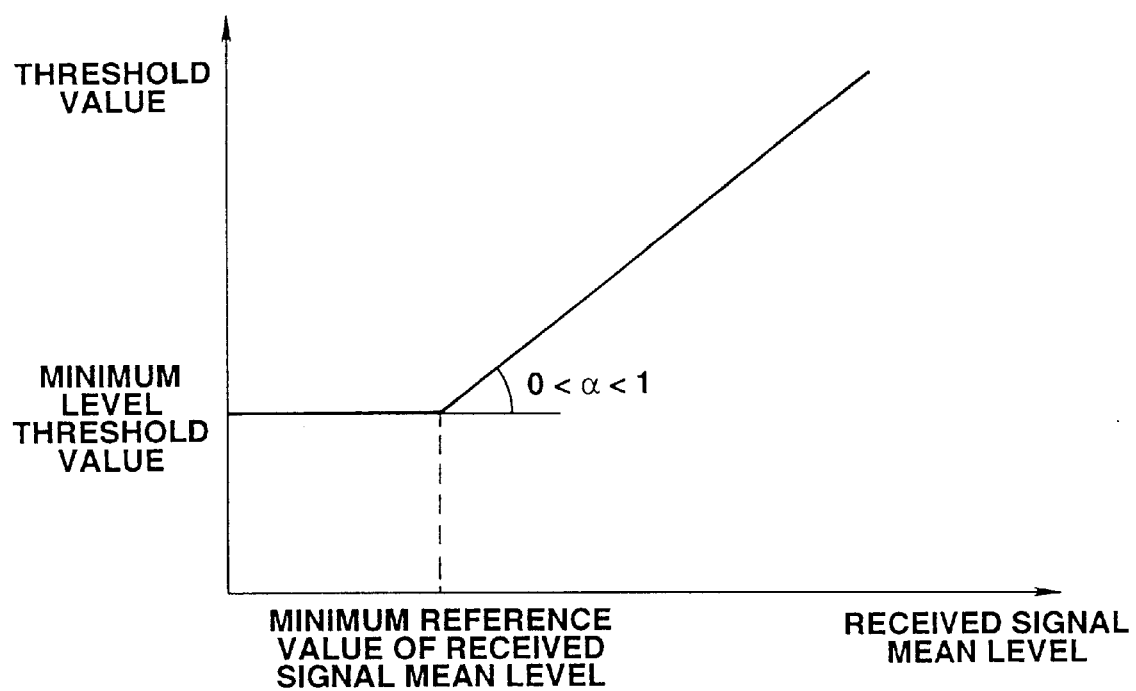
FIG. 6 is a diagram illustrating the relation between a received signal mean level and a threshold value of the embodiment shown in FIG. 4.

FIG. 6 shows the relation between the received signal mean level and the threshold value. The received signal mean level and the threshold value are in a proportional relationship when the received signal mean level is high, and the threshold value increases with an increase in the received signal mean level and decreases with a reduction in the received signal mean level. The threshold value is fixed at a minimum-level threshold value when the received signal mean level drops below the minimum reference level. With this arrangement, the disadvantage that the incoming-signal quality is deteriorated as a result of frequent antenna changes at low received signal levels, which is encountered in the conventional method in which the switched antenna is again switched back to the original antenna when the received signal level of the switched antenna is lower than the threshold value, can be prevented.

Figure 7:
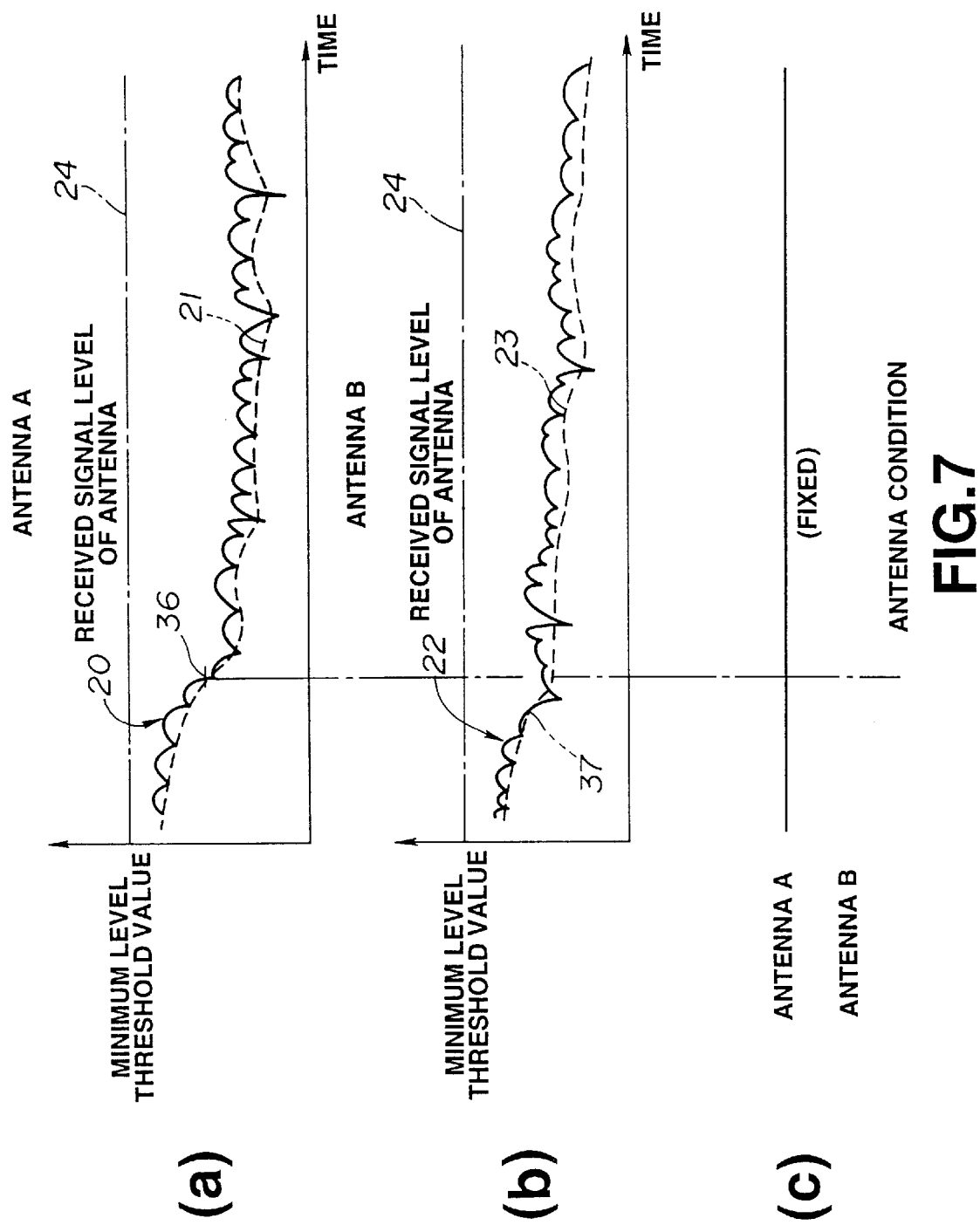
FIG. 7 is a diagram illustrating the relation between the received signal mean level and the threshold value when the receiving level is low for the embodiment shown in FIG. 4.

FIG. 7 is a diagram showing the manner in which antenna switching is performed when the received signal level of the embodiment under consideration is relatively low.

Part (a) of FIG. 7 illustrates the received signal level of an antenna A; Part (b) of FIG. 7, the received signal level of an antenna B; and Part (c) of FIG. 7, the manner in which the antennas are used.

In this embodiment as well, antenna switching is performed under the same conditions as in FIG. 3 when the received signal level is comparatively high. On the other hand, a minimum-level threshold value is selected as the threshold value for the antenna A when the received signal level 20 of the antenna A currently in use drops below a minimum reference value 24 of the received signal mean level, as shown in FIG. 7. In this case, the control switch 11 is turned off, and no antenna switching occurs even when the received signal level 20 of the antenna A drops below the normal threshold value 21, which is obtained by multiplying the received signal mean level at a corresponding point (such as point 36) by a fixed value $\alpha$.

Figure 8:
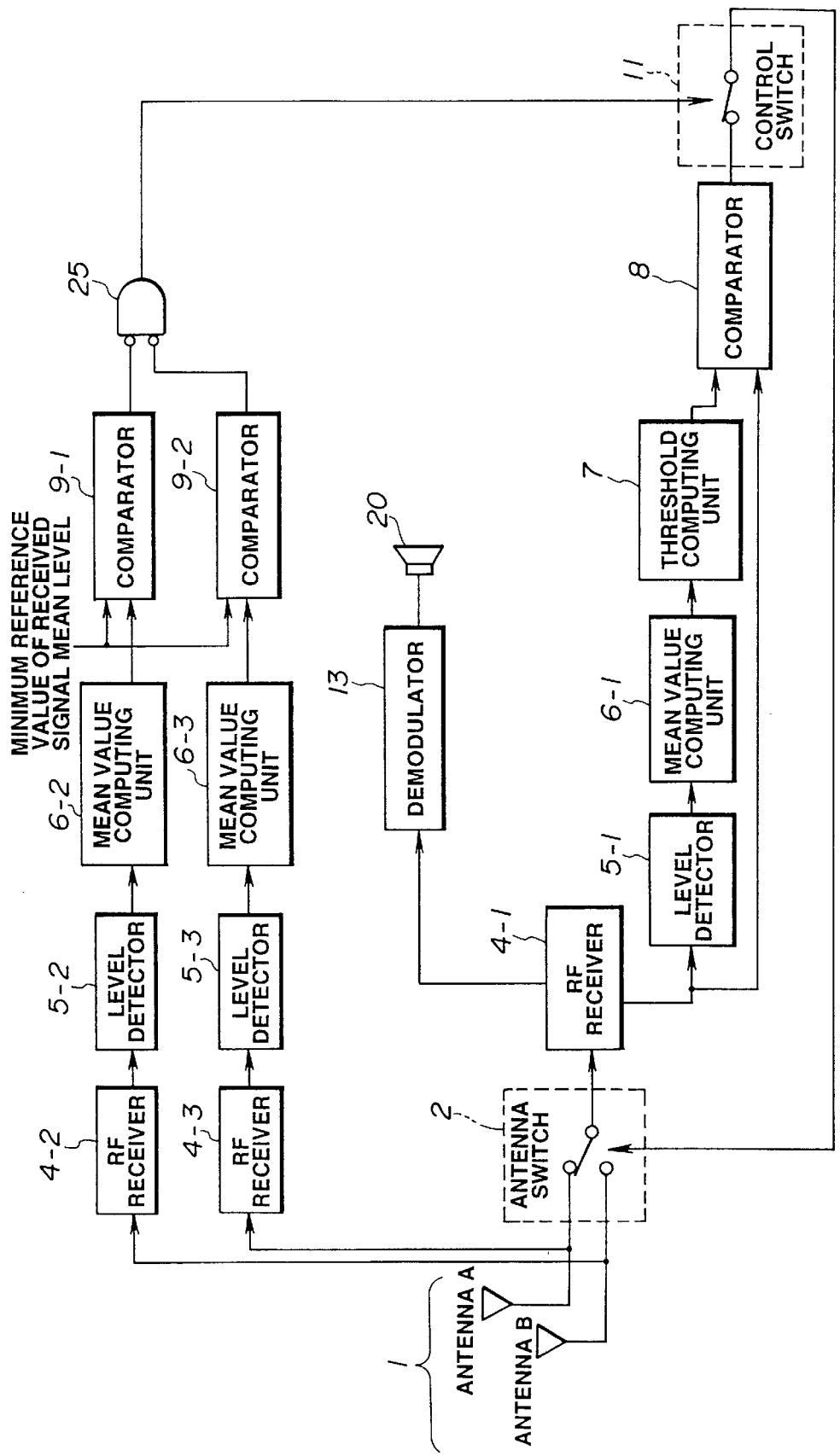
FIG. 8 is a block diagram illustrating the receiver of the radio communication apparatus pertaining to yet another embodiment of the present invention.

FIG. 8 is a block diagram of yet another embodiment of the present invention, corresponding to the receiving circuit of a radio communication apparatus.

In FIG. 8, 1 represents antennas; 2 is an antenna switch for switching between an antenna A and an antenna B; 4-1, 4-2, and 4-3 are RF receivers for receiving radio-frequency signals; 5-1, 5-2, and 5-3 are level detectors for determining the receiving levels of incoming signals; 6-1, 6-2, and 6-3 are mean value computing units for determining the mean levels of incoming signals on the basis of the outputs from the level detector 5-1, 5-2, and 5-3; 7 is a threshold computing unit for determining a threshold value by multiplying the received signal mean levels by a certain fixed value, 8 is a comparator for switching antenna by comparing the threshold value with the received signal levels; 9-1 and 9-2 are comparators for comparing the mean levels of incoming signals with a preset minimum level, 11 is a control switch for stopping antenna switching by means of the output from a gate circuit 25; and 25 is a gate circuit for turning off the control switch 11 when both outputs of comparators 9-1 and 9-2 are inverted (when the outputs of the mean value computing units 6-2 and 6-3 are lower than those of the received signal mean levels). Identical symbols are assigned to the components that have the same functions as the blocks in FIGS. 1 and 4.

The difference between this embodiment and the embodiment illustrated in FIG. 4 is that the received signal mean levels of the antennas A and B are constantly measured, the measurement results are compared with the minimum reference value of the received signal mean levels by the comparators 9-1 and 9-2, and the control switch 11 is turned off only when both of the received signal mean levels of the antennas A and B are lower than the minimum reference value of the received signal mean levels.

Antenna switching is therefore performed when the received signal mean level of one antenna is lower than the minimum reference value of the received signal mean level but the received signal mean level of the other antenna is not lower than the minimum reference value, and a possibility is thus preserved for switching to the other antenna with a high received signal mean level.

Figure 9:
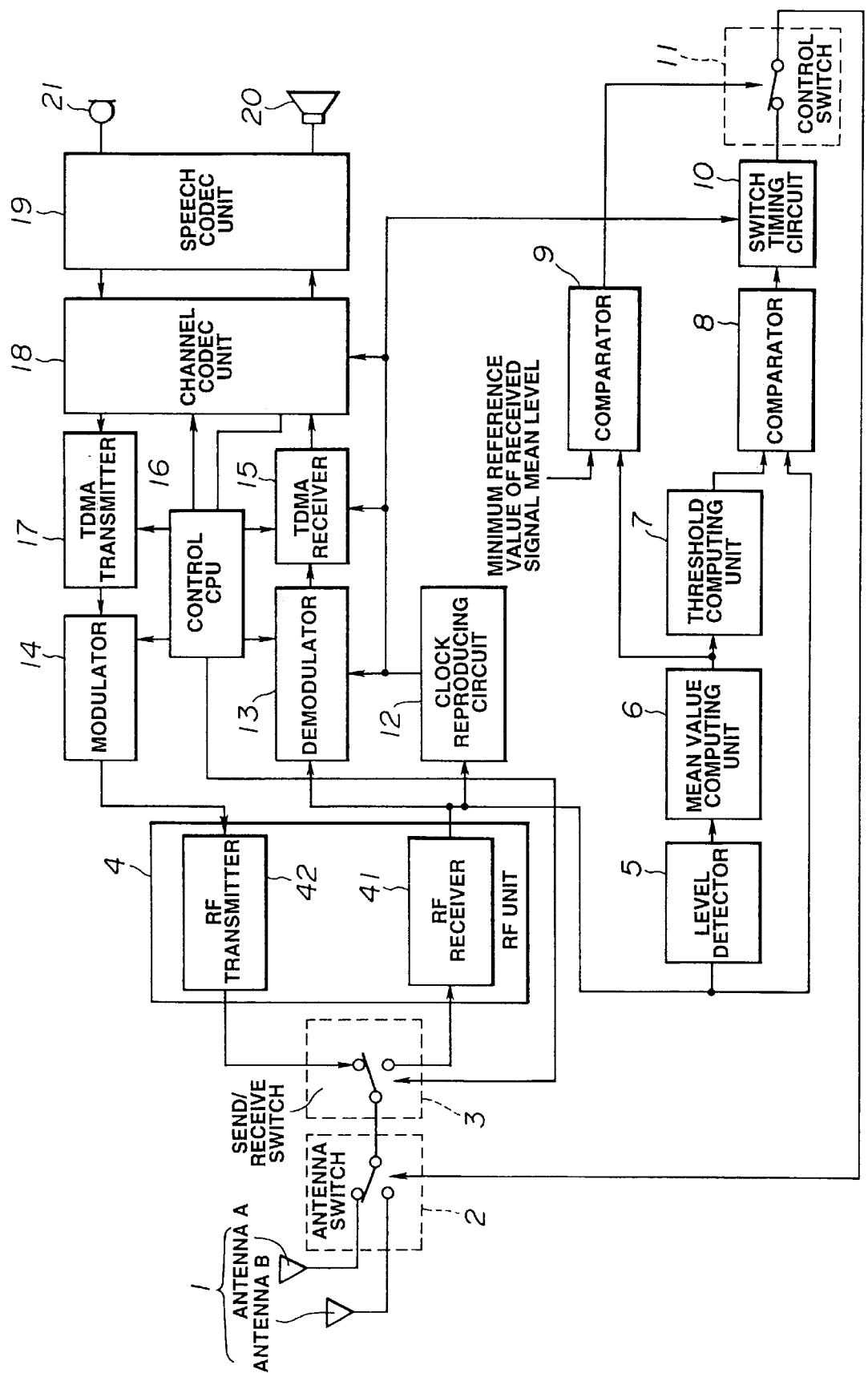
FIG. 9 is a block diagram illustrating the radio communication apparatus pertaining to still another embodiment of the present invention.

FIG. 9 illustrates still another embodiment of the present invention. This structure pertains to an example in which the present invention is applied to a portable radio terminal.

In FIG. 9, 1 represents antennas; 2 is an antenna switch for switching between an antenna A and an antenna B; 3 is a send/receive switch for connecting the output of the antenna switch 2 to an RF transmitter 42 during a transmission period, and to an RF receiver 41 during a receiving period; 4 is an RF unit for sending and receiving radio-frequency signals in which the RF receiver 41 receives radio waves from a base station, subjects them to intermediate-frequency processing, and converts them to digital baseband signals, and in which the RF transmitter 42 subjects the digital baseband signals to intermediate-frequency processing, converts them to a radio frequency, performs power amplification, and sends the signals in the form of radio waves to the base station; 5 is a level detector for determining the receiving level of incoming signals; 6 is a mean value computing unit for determining the mean level of incoming signals on the basis of the output from the level detector 5; 7 is a threshold computing unit for determining a threshold value by multiplying the received signal mean level by a certain fixed value; 8 is a comparator for switching antenna by comparing the threshold value with the received signal level; 9 is a comparator for comparing the mean level of incoming signals with a preset minimum level; 10 is a switch timing circuit for preventing the timing of antenna switching from shifting and the switch from occurring at the time-position of incoming data detection; and 11 is a control switch for stopping antenna switching by means of the output from the comparator 9. In addition, 12 through 21 are components of a transceiver circuit, wherein 12 is a clock readout circuit for reading out the incoming clock pulses contained in the incoming signals; 13 is a demodulator for demodulating incoming digital baseband signals; 14 is a modulator for modulating the signals from a TDMA (Time Division Multiple Access) transmitter to transform then into digital baseband signals; 15 is a TDMA receiver for detecting and receiving local times slots from the waves received in the TDMA mode; 16 is a control CPU for receiving control data from the incoming output of a channel codec unit 18 and for controlling the entire circuit; 17 is a TDMA transmitter for placing voice-coded signals into the self-slot of TDMA signals; 18 is a channel codec unit for performing compression in such a way that the redundancy of the voice signals on the transmitting side is utilized to encode the voice signals with high efficiency and to place them in the self-slot, and for expanding and demodulating the incoming data signals within the received slot on the receiving side; 19 is a speech codec unit for digitally encoding the voice on the transmitting side and demodulating the voice signals that are output from the channel codec unit 18 on the receiving side; 20 is a speaker as a telephone receiver; and 21 is a microphone as a telephone transmitter.

In this circuit, the level detector 5 calculates the receiving level during the receiving period, and the mean value computing unit 6 calculates the incoming signal mean level on the basis of the output from the level detector 5 during the receiving period. To prevent antenna switching from coinciding with the sampling period of baseband signals, the switch timing circuit 10 sends switch signals in which switch timing has been adjusted in synchronism with the output of the clock readout circuit 12 to the antenna switch 2.

Figure 10:
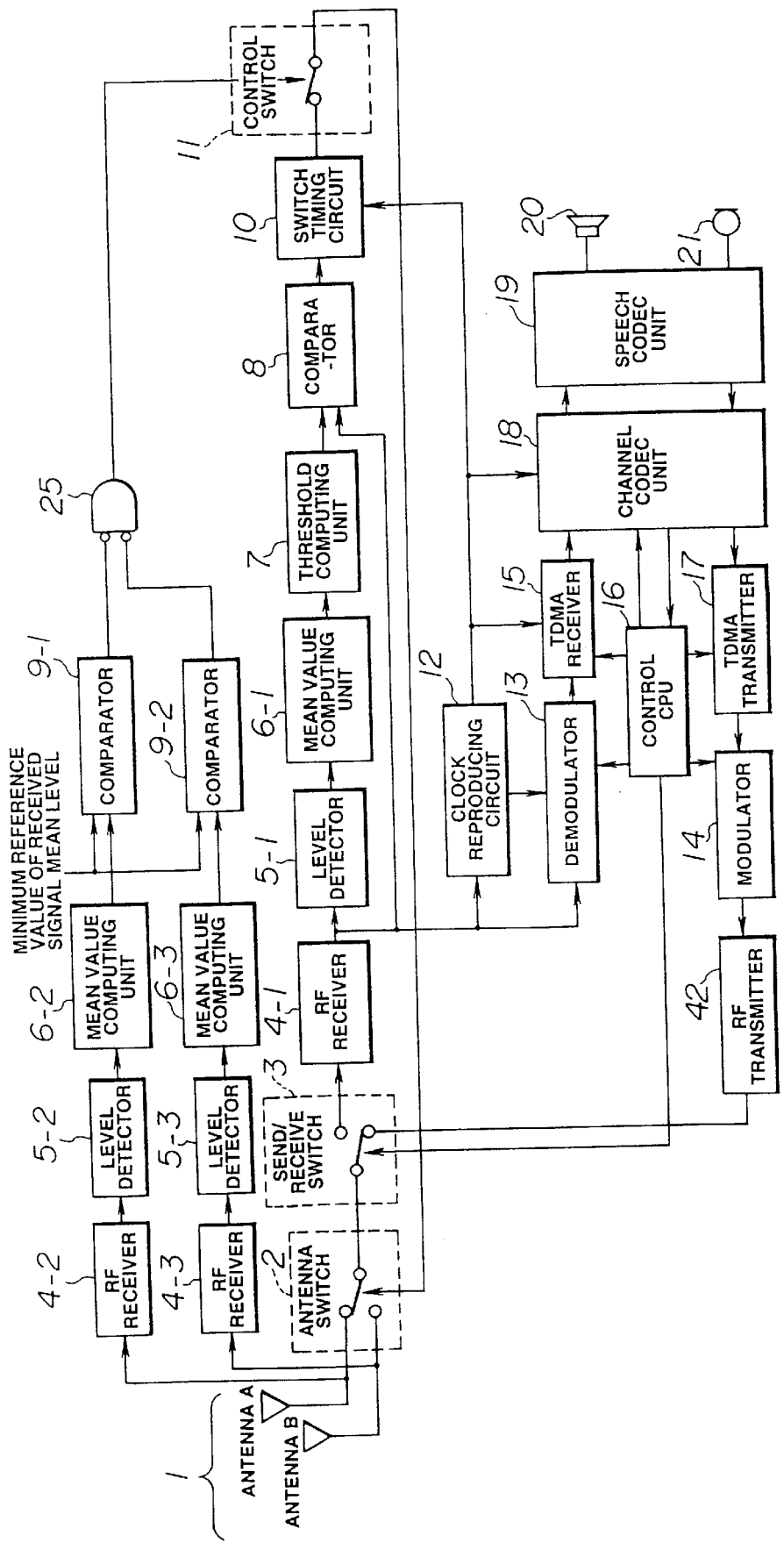
FIG. 10 is a block diagram illustrating the radio communication apparatus pertaining to yet another embodiment of the present invention.

FIG. 10 illustrates yet another embodiment of the present invention, in which the present invention is applied to a portable radio terminal.

In FIG. 10, 1 represents antennas; 2 is an antenna switch; 3 is a send/receive changing switch; 4-1, 4-2, and 4-3 are RF receivers; 5-1, 5-2, and 5-3 are level detectors; 6-1, 6-2, and 6-3 are mean value computing units; 7 is a threshold computing unit; 8 is a comparator for switching antenna by comparing with the received signal level the threshold value that is output by the threshold computing units; 9-1 and 9-2 are comparators for comparing the mean levels of incoming signals with a preset minimum level; 10 is a switch timing circuit; 11 is a control switch for stopping antenna switching by means of the output from a gate circuit 25; and 25 is a gate circuit for turning off the control switch 11 when outputs of both the comparator 9-1 and the comparator 9-2 are inverted. In addition, 12 through 21 are components of a transceiver circuit, and the function of each block is the same as that in FIG. 9. 42 is an RF transmitter.

The difference between this embodiment and the embodiment illustrated in FIG. 9 is that the received signal mean levels of the antennas A and B are constantly measured, the measurement results are compared with the minimum reference value of the received signal mean levels by the comparators 9-1 and 9-2, and the control switch 11 is turned off only when both of the received signal mean levels of the antennas A and B are lower than the minimum reference value of the received signal mean levels.

Antenna switching is therefore performed when the received signal mean level of one antenna is lower than the minimum reference value of the received signal mean level but the received signal mean level of the other antenna is not lower than the minimum reference value, and a possibility is thus preserved for switching to an antenna with a high received signal mean level.

Of the continuous signals transmitted by a base station, only the local time slots should be received by a mobile station when TDMA (Time Division Multiple Access) is used as the access mode for the radio communication. Antenna switching diversity can therefore be accomplished by measuring the receiving level of an antenna using the idle time immediately preceding the local communication slot.

Figure 11:
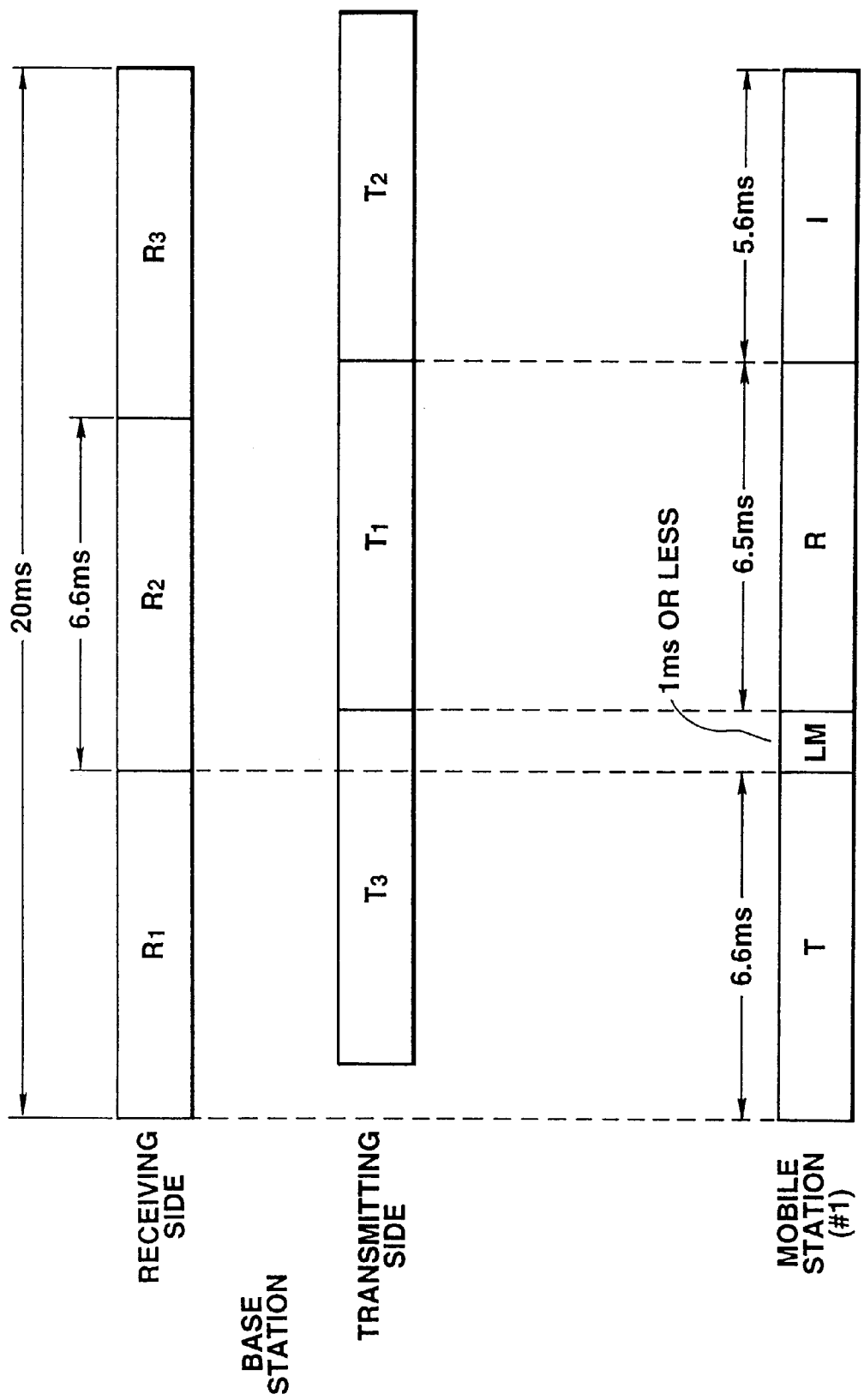
FIG. 11 is a diagram illustrating an example of a time slot in a TDMA mode.

FIG. 11 illustrates an example of a structure of a time slot that includes a receiving level measurement period for performing antenna switching diversity in a TDMA mode.

FIG. 11 illustrates the transmitting and receiving timing of a base station, as well as the send/receive mode of mobile station No. 1, for a multiplicity composed of three channels. In the figure, R is a receiving period, T is a transmission period, I is an idle period, and LM is a receiving level measuring period for antenna switching diversity. The subscripts on the base station side indicate the mobile station numbers. A TDMA mode thus allows the receiving level to be measured for each antenna using periods in which a switch is made from a transmission period to a receiving period on the mobile station side.

Figure 12:
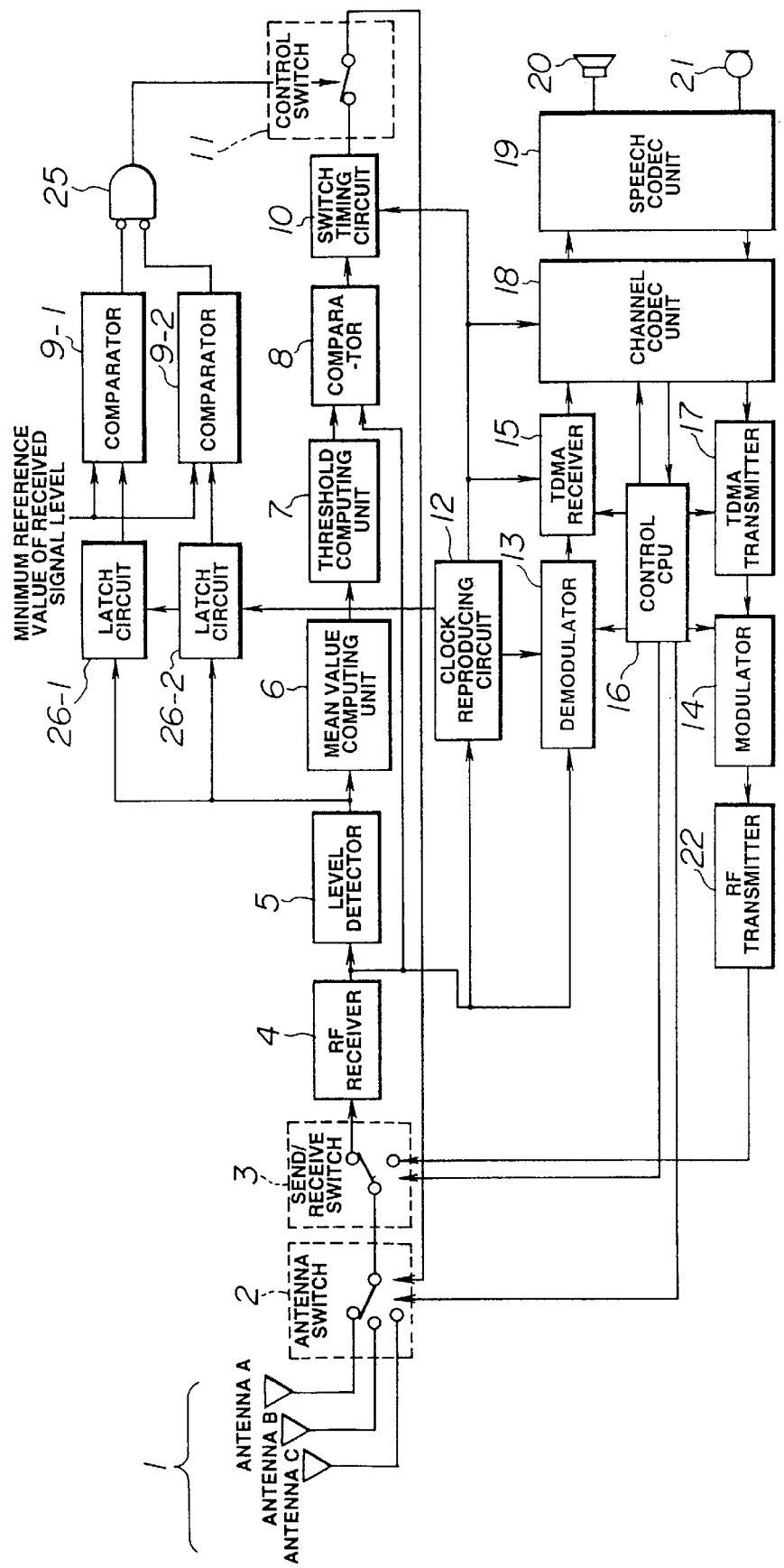
FIG. 12 is a block diagram illustrating a radio communication apparatus pertaining to still another embodiment of the present invention.

FIG. 12 illustrates still another embodiment, in which the present invention is applied to a portable radio terminal for measuring the receiving level of a currently idle antenna, using a receiving level measuring period for performing such antenna switching diversity.

In FIG. 12, 1 represents antennas A, B, and C, respectively. All the other blocks fulfill the same functions as in FIG. 9. The difference between this embodiment and the embodiment illustrated in FIG. 9 is that the antenna switch 2 is switched by the control action of the control CPU during the receiving level measurement period (LM in FIG. 11) for performing antenna switching diversity, and that the values detected by the level detector 5 and related to the receiving levels (rather than to the received signal mean levels) of all antennas except those currently in use are stored in latch circuits 26-1, 26-2, . . . and compared with the minimum reference value of the received signal levels by means of comparators 9-1, 9-2, . . .

As a result, the control switch 11 is turned off and antenna switching is stopped when it is determined by the comparators 9-1, 9-2, . . . that the receiving levels of all the antennas currently not in use are lower than the minimum reference value of the received signal level.

The present invention thus involves the use of a radio communication apparatus for performing communication using antenna switching diversity in which a plurality of antennas are switched in accordance with their received signal levels, wherein the mean value of the received signal levels is calculated, a product of multiplying the received signal mean level by a prescribed ratio is used as a first threshold value, and when the received signal level drops below the first threshold value, communication is performed by switching to a receiving antenna operating at a received signal level that is higher than the first threshold value.

Another feature is that antenna switching is not performed when the received signal mean level drops below a specific fixed value serving as a second threshold value.

This allows antenna switching to be performed in accordance with changes in the received signal level and prevents a receiving antenna that operates at a receiving level lower than the threshold value from being fixedly selected due to the fact that the first threshold value changes in relation to the mean value.

Yet another feature is that unnecessary antenna switching is avoided when the level falls below the second threshold value.

What is claimed is:

1. A radio communication apparatus for use in a radio communication system, having a radio circuit, the apparatus comprising:

a first antenna connected with the radio circuit for receiving first and second signals, wherein the second signal is received earlier in time than the first signal;

a second antenna;

first detecting means for detecting a first level of the first signal and a second level of the second signal;

first average calculating means responsive to the first detecting means for calculating a first average level from the first and second levels;

comparing means responsive to the first average calculating means for comparing the first average level with a predetermined value; and control means for maintaining a status in which the first antenna is connected with the radio circuit when the first average level is smaller than the predetermined value.

2. A radio communication apparatus for use in a radio communication system, having a radio circuit, the apparatus comprising:

a first antenna connected with the radio circuit for receiving first and second signals, wherein the second signal is received earlier in time than the first signal;

first detecting means for detecting a first level of the first signal and a second level of the second signal;

first average calculating means responsive to the first detecting means for calculating a first average level from the first and second levels;

a second antenna for receiving third and fourth signals, wherein the fourth signal is received earlier in time than the third signal;

second detecting means for detecting a third level of the third signal and a fourth level of the fourth signal;

second average calculating means responsive to the second detecting means for calculating a second average level from the third and fourth levels;

comparing means responsive to the first and second calculating means for comparing each of the first and second average levels with a predetermined value; and control means for maintaining a status in which the first antenna is connected with the radio circuit only when each of the first and second average levels is smaller than the predetermined value.

3. A radio communication apparatus for use in a radio communication system, having a transmit circuit and a receive circuit, the apparatus comprising:

a first antenna for receiving first and second signals, wherein the second signal is received earlier in time than the first signal;

a second antenna;

selecting means for selecting one of the first and second antennas;

connecting means for selectively connecting the selecting means with the transmit circuit for a transmit period and selectively connecting the selecting means with the receive circuit for a receive period and selectively disconnecting the selecting means from any one of the transmit and receive circuits for an idle period, the first antenna being connected with the connecting means by the selecting means;

first detecting means for detecting a first level of the first signal and a second level of the second signal for the idle period;

first average calculating means responsive to the first detecting means for calculating a first average level of a signal received by the first antenna from at least the first and second levels;

comparing means responsive to the first average calculating means for comparing the first average level with a predetermined value; and control means for maintaining a status in which the first antenna is connected with the connecting means when the first average level is smaller than the predetermined value.

4. The apparatus of claim 3, wherein the second antenna receives third and fourth signals, the fourth signal is received earlier in time than the third signal, the apparatus further comprising:

second detecting means for detecting a third level of the third signal and a fourth level of the fourth signal;

second average calculating means responsive to the second detecting means for calculating a second average level of a signal received by the second antenna from the third and fourth levels;

second comparing means responsive to the first and second average calculating means for comparing each of the first and second average levels with a second predetermined value; and second control means for maintaining a status in which the first antenna is connected with the connecting means when each of the first and second average levels is smaller than the second predetermined value.

5. The apparatus of claim 4, wherein the second detecting means detects the third level and the fourth level for the idle period.

* * * * *